United States Patent [19]

Uemura et al.

[11] 4,220,474
[45] Sep. 2, 1980

[54] AMORPHOUS REFRACTORY COMPOSITIONS

[75] Inventors: Seiichi Uemura; Syunichi Yamamoto, both of Kawasaki; Takao Hirose, Kamakura; Hiroaki Takashima, Kawasaki; Osamu Kato, Yokohama; Minoru Nagai, Kawasaki, all of Japan

[73] Assignees: Nippon Oil Co., Ltd.; Shinagawa Refractories Co., Ltd., both of Tokyo, Japan

[21] Appl. No.: 1,259

[22] Filed: Jan. 5, 1979

[30] Foreign Application Priority Data

Jan. 19, 1978 [JP] Japan .................................... 53-3726

[51] Int. Cl.$^2$ ............................................. C04B 35/52
[52] U.S. Cl. ........... ............................... 106/44; 106/56; 106/65; 106/67
[58] Field of Search ..................... 106/44, 56, 65, 67; 208/41, 349, 367

[56] References Cited

U.S. PATENT DOCUMENTS

| | | | |
|---|---|---|---|
| 3,994,738 | 11/1976 | Visser ...................................... | 106/56 |
| 4,008,194 | 2/1977 | Shintani ................................ | 106/56 |
| 4,022,739 | 5/1977 | Bove ...................................... | 106/56 |
| 4,072,531 | 2/1978 | Funabiki et al. ....................... | 106/56 |

*Primary Examiner*—James Poer
*Attorney, Agent, or Firm*—Jordan and Hamburg

[57] ABSTRACT

An amorphous refractory composition comprising a petroleum-derived binder prepared by feeding a fraction boiling at not lower than 150° C. obtained by thermal or steam cracking of petroleum-derived hydrocarbons, into a first-step agitating vessel where the fraction is heat treated under specific conditions, feeding the thus heat treated fraction into a second-step agitating vessel where it is heat treated under specific conditions and then removing the light fraction from the further heat treated fraction thereby to obtain the petroleum-derived binder.

6 Claims, 1 Drawing Figure

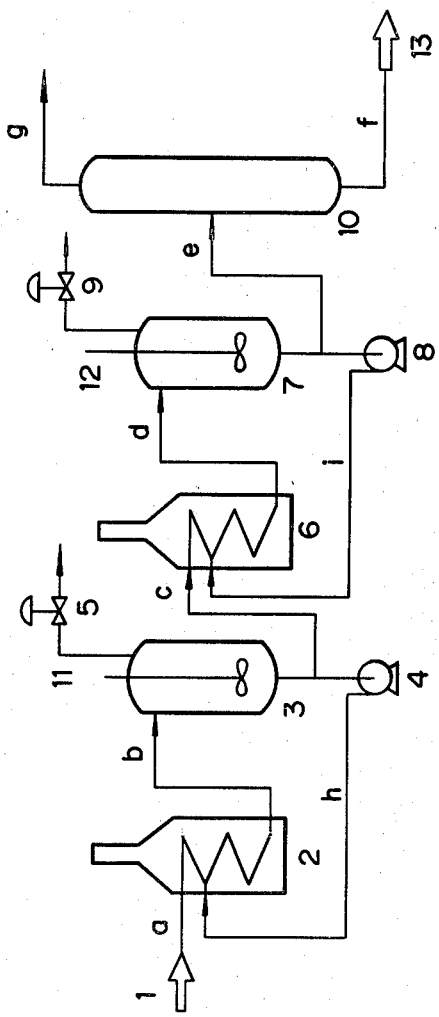

AMORPHOUS REFRACTORY COMPOSITIONS

This invention relates to amorphous refractory compositions and more specifically to such compositions particularly suitable as refractory materials for blocking the pig iron outlet of blast furnaces.

With the recent enlargement of blast furnaces and enhanced-pressure operation thereof, the production capacity of the furnaces and the number of times of pig iron discharged therefrom have been remarkably increased. Because of this, for example, the operation and safety of opening and closing of the pig iron outlet of the furnaces have been regarded as very important from the view-point of the overall operation and productivity increase of the furnaces and, therefore, the requirements for refractory compositions for blocking the pig iron outlet are very severe and those which will meet such requirements are sought to be rapidly developed.

In general, the main properties required in refractory compositions for blocking the pig iron outlet of blast furnace or the like, are illustrated below.

(1) Refractory compositions should be filled in easily by mud guns, (2) They should be hardened soon after being filled in, and their initial strength should be high, (3) They should have high bond strength at high temperatures thereby making it possible to lengthen the duration of discharge of pig iron, (4) They should facilitate the operation of opening the outlet when they are used for blocking it, and (5) They should neither generate much of black smoke nor cause unusual dust generation.

Refractory compositions which have heretofore been generally used for blocking pig iron outlets are blends prepared by kneading alumina, Schamotte (fireclay), agalmatolite, coke, clay and/or the like with a binder such as tar. However, the tar-derived binders are disadvantageous in that they will take a longer time to harden, have a lower initial strength and require a long time to be baked when used, thereby lowering the productivity. In addition, the tar type binders are not suitable for the recent high pressure and large-sized blast furnaces from which pig iron is discharged at a high temperature and rate since they are no more satisfactory in bond strength for use for such furnaces. They are further disadvantageous in that they are likely to impair the health of people working in factories wherein they are handled and used. There have recently been known the techniques of using synthetic resin binders, such as phenolic resins and furan resins, in substitution for the tar type binders, however, the former binders have various disadvantages and are therefore unsatisfactory.

There have also been proposed the use as binders, of polymers prepared by thermally polymerizing a heavy oil fraction obtained by steam cracking petroleum in the presence or absence of a catalyst (Japanese Patent Application Laying-Open Gazette No. 62321/77). However, these known binders are not yet fully satisfactory as binders for blocking materials for pigment iron outlet as indicated in Comparative examples to be mentioned later and are therefore desired to be further improved. In addition, in the processes for producing the aforesaid known binders, for example carbon tends to deposit and consequently cause local overheating in thermal reactors thereby rendering it impossible to produce binders in a continuous and industrially advantageous manner. In cases where a propane-deasphalted asphalt is used as the binder, the asphalt will take a longer time to harden and make the duration of discharge of pig iron shortened with the intercarbon bond strength of the asphalt being low.

An object is to provide amorphous refractory compositions particularly suitable as refractory materials for blocking the pig iron outlet of blast furnaces.

The refractory aggregate or materials may be used in this invention include heretofore used ones such as alumina, Schamotte (fireclay), agalmatolite, coke, clay and carbon silicate.

The refractory compositions of this invention consist essentially of 15-40% by weight of the binder and 60-85% by weight of the refractory aggregate (materials). The refractory aggregate may comprise, by weight, 0-50 (preferably 10-40) parts of coke, 0-50 (preferably 20-40) parts of alumina, 0-40 (preferably 10-30) parts of silicon carbide, 0-30 (preferably 5-25) parts of clay, 0-30 parts of agalmatolite and 0-30 parts of Schamotte. Examples of preferable composition of the refractory aggregate are as follows.

|  | Example 1 | Example 2 | Example 3 |
| --- | --- | --- | --- |
| Coke | 35 (Parts by weight) | 15 (Parts by weight) | 25 (Parts by weight) |
| Alumina | 30 (Parts by weight) | 30 (Parts by weight) | 20 (Parts by weight) |
| Silicon carbide | 25 (Parts by weight) | 20 (Parts by weight) | 20 (Parts by weight) |
| Clay | 10 (Parts by weight) | 10 (Parts by weight) | 15 (Parts by weight) |
| Agalmatolite | 0 (Parts by weight) | 0 (Parts by weight) | 20 (Parts by weight) |
| Schamotte | 0 (Parts by weight) | 5 (Parts by weight) | 0 (Parts by weight) |

The petroleum-derived binders used in this invention are prepared by a specific process. It has been found by the present inventors that the use in refractory compositions, of the petroleum-derived binders prepared by the specific process according to this invention will substantially eliminate the drawbacks of the conventional refractory compositions. This invention is based on this finding or discovery.

The specific process for producing the petroleum-derived binders of this invention will be detailed hereinbelow.

In this invention, there is used as the starting material for the binders a residual oil boiling at not lower than 150° C. which is obtained as a by-product at the time of producing olefins by thermal or steam cracking of petroleum-derived hydrocarbons. The petroleum-derived hydrocarbons used herein may usually be light hydrocarbons such as naphtha and kerosene, and the thermal or steam cracking may usually be effected at 600° to 1000° C. The residual oils used as the starting oils herein include those having a boiling point of at least 150° C. as mentioned above, with those having a boiling point of at least 200° C. being particularly preferred.

The process according to this invention comprises feeding the residual oil continuously into a first-step agitating vessel maintained at a pressure of at least 2 Kg/cm$^2$ and a temperature of 300° to 360° C., keeping the oil therein for an average residence time of at least 15 minutes, withdrawing the first-step treated oil continuously from the first-step agitating vessel, charging the first-step treated oil into a second-step agitating vessel maintained at a temperature of 370° to 450° C., keeping the oil therein for an average residence time of 30 minutes to 10 hours, withdrawing the second-step treated oil continuously from the second-step agitating vessel and then removing from the second-step treated oil the light fraction contained therein, thereby to produce a petroleum-derived binder continuously.

The reaction in the first-step agitating vessel according to this invention must be effected under certain strict conditions for effectively obtaining the petroleum-derived binder of this invention. First of all, the pressure used in the first-step vessel should be at least 2 Kg/cm$^2$G (Gauge), preferably 2 to 30 Kg/cm$^2$G and more preferably 5 to 20 Kg/cm$^2$G. It is necessary that the pressure be high enough to confine the oil vapor of the starting oil to the first-step vessel; however, higher pressures such as external pressures exerted by inert gases or the like, may also be used in this invention if required operationally.

On the other hand, the use of lower pressures, such as atmospheric pressure, than is necessary for this invention in the heat treatment will not only result in a low yield of the binder but also result in causing troubles such as precipitation of carbon. The first-step agitating vessel should be maintained in the range of from 300° to 360° C., preferably 330°-350° C. In order to attain the object of this invention, the temperature in the first-step vessel may of course be varied within said range during the operation, but it may preferably be a certain fixed one within said range if required operationally. The use of a temperature of lower than 300° C. will not yield the binder of this invention, while the use of a temperature of higher than 360° C. will raise problems such as carbon precipitation in the first-step agitating vessel thereby rendering it difficult to effect a continuous operation. In this invention, the starting oil should be present in the first-step agitating vessel for an average residence time of at least 15 minutes. The average residence time may be in the range of from 15 minutes to 10 hours, preferably from 1 to 5 hours. An average residence time of shorter than 15 minutes is not suitable for obtaining the binder of this invention.

The first-step treated oil from the first-step vessel is then charged into the second-step agitating vessel. The second-step vessel should be maintained in the range of from 370° to 450° C., preferably from 390° to 430° C. It is usually preferable to maintain the second-step vessel at a certain fixed temperature in order to meet the requirements for a continuous operation. The use of a temperature lower than 370° C. will not result in substantial improvement of the resulting binder in properties, while the use of a temperature of higher than 450° C. will result in the production of coke-like material rather than binder; the product produced in each case will be of no commercial value. The average residence time in the second-step agitating vessel may suitably be selected in view of the treating temperature in the second-step vessel and it may be usually 30 minutes to 10 hours, preferably 1 to 5 hours. The pressure used in the second-step vessel is not particularly limited, but it may be 2 to 20 Kg/cm$^2$G, preferably 5 to 15 in view of yields and problems as to operation.

The binder is obtained by removing the light fraction from the second-step treated oil. The method for removal of the light fraction is not particularly limited but it usually comprises adjusting the pressure in the second-step vessel thereby allowing the light fraction to escape through a pressure-control valve or comprises distilling off the light fraction by distillation under reduced pressure such as continuous flushing. The light fraction referred to herein is a fraction boiling at lower than about 200° C. In other words, the binder of this invention preferably consists substantially of a heavy fraction boiling at not lower than 200° C. The term "substantially" used herein is intended to mean that the binder of this invention is allowed to contain the light fraction in such an amount that the fraction will have no adverse effects on the carbon-containing amorphous refractory compositions containing the binder. It is preferable that the amount of the light fraction usually contained in the binder should be in the range of 0 to 5% by weight.

According to this invention, a binder of this invention may also be obtained from a blend prepared by mixing a heavy fraction obtained by the distillation-off of a fraction boiling at higher than 200° C. with a suitable amount of a fraction boiling at a lower temperature than said heavy fraction. The binder may be obtained, for example, by incorporating a pitch-like material obtained by the distillation-off of a fraction boiling at not higher than 400° C. with a suitable amount of a fraction boiling at 200°-300° C.

In each case, it is necessary that the binder be prepared so that it has a viscosity of 100-10000 cps, preferably 300-3000 cps, at 50° C. If the binder has a viscosity of less than 100 cps then it will not exhibit plasticity necessary for extruding the blocking material, while if it has a viscosity of higher than 10000 cps then it will make the kneading thereof with other ingredients.

In the invention, the starting oil is usually preliminarily heated to a predetermined temperature before being charged into the first-step agitating vessel. The "predetermined temperature" referred to herein is intended to mean the temperature within the first-step agitating vessel or a temperature somewhat higher than the former. There are methods for the preliminary heating of the starting oil, such as a method comprising passing the starting oil through heating tubes to directly heating it to a predetermined temperature; a method comprising withdrawing the recycling oil, heating the recycling oil so withdrawn and then mixing the heated recycling oil with the starting oil to raise the temperature of the starting oil to a predetermined temperature; a method comprising mixing the heated recycling oil with the starting oil heated to a certain temperature by passage through the heating tubes, thereby to heat the starting oil to a predetermined temperature; and a method comprising mixing the recycling oil with the starting oil and passing the resulting mixture through the heating tubes thereby to heat the starting oil to a predetermined temperature. The starting oil may be charged into the first-step agitating vessel without the preliminary heating thereof if the vessel is provided with a heating device, or else it may be charged into the first-step agitating vessel after being preliminarily heated by any one of the aforesaid methods.

The first-step treated oil from the first-step agitating vessel is charged into the second-step agitating vessel; in this case, it is usually preliminarily heated before being charged into the second-step vessel. This preliminary heating may be effected by any one of said methods.

The time needed for heating the starting oil or the treated oil to a predetermined temperature by passing the oil through the heating tubes, is not particularly limited but may advantageously be in the range of not longer than about 5 minutes from the industrial point of view. To raise the temperature of the oil to the predetermined temperature in more than 5 minutes, longer heating tubes have to be used or the linear velocity have to be extremely retarded; these heating methods are are not considered to be industrially economical ones.

By the specific process according to this invention there may be obtained in a high yield binders having satisfactory properties such that their fixed carbon content is usually 30-50% and their viscosity at which the kneading thereof with other ingredients and the extrusion of the kneaded mixture are facilitated.

In the practice of the specified two-step treatment of this invention, no carbon precipitation takes place in the first-step and second-step agitating vessels and no carbon deposition takes place in the heating tubes when the starting oil is preliminarily heated, thereby making it possible to produce the binder of this invention continuously while keeping this heat treating system in good operational condition. Thus, the process of this invention is clearly differentiated from the conventional ones.

The agitating vessels used herein are those which have a desired inner volume and permit materials therein to be kept in perfectly agitated state. They are a tank-type vessel usually provided with agitating vanes. As such vessels, steel-made drums fitted with agitating vanes are generally used.

In a process for heat treatment using such agitating vessels, a homogeneous mixture of reactants may be obtained, an average residence time may suitably be selected and a long average residence time may also be adopted, temperature control may be easily effected, a heat treating temperature may be maintained at a fixed level and a stable operation may be performed. Thus, such a process enables the reaction to be completed very stably and simultaneously yields products of uniform quality in a satisfactorily reproducible manner and in a good yield; the process is very advantageous in the aforesaid respects as compared with a process using tubular reactors. However, when the process using the agitating vessels is employed in the heat treatment of a heavy fraction, it will sometimes exhibits disadvantages that agitation is made impossible due to coking in the vessels and the stoppage of the apparatus is consequently caused.

On the other hand, as previously mentioned, according to this invention, the use of the first-step and second-step agitating vessels for the heat treatment under the pedetermined conditions will exhibit advantages while eliminating said disadvantages. It has further been found that the petroleum-derived binders obtained by the process of this invention are remarkably effective when used as binders for blocking the pig iron outlets of blast furnaces.

The reason why the petroleum-derived binders obtained by the process of this invention are remarkably excellent as binders for materials for blocking the pig iron outlets, is not strictly clear. On the other hand, it has been found that the amount of benzene-insoluble matter will rapidly increase at the initial stage of heat treating the starting oil when binders are produced from a petroleum-derived heavy fraction (the benzene-insoluble matter being hereinafter referred to as "initial benzene-insoluble matter"); the reason for this is considered that certain ingredients contained in the starting oil would be converted to the initial benzene-insoluble matter or deposited carbon during the heat treatment.

In contrast, it is considered that according to the process of this invention, said certain ingredients would be converted to stable matter by isomerization and the like in the first-step treatment and the stable matter so produced would be kept stable even in the second-step treatment thereby inhibiting carbon production and simultaneously providing the resulting binder with specific properties different from those of conventional binders. Thus, the binders of this invention is considered to exhibit excellent performance when used as binders for blocking materials for pig iron outlets.

The amount of the binder added to refractory aggregate may preferably be in the range of 15-40% by weight of the aggregate. The use of less than 15% by weight of the binder will result in the production of a refractory composition which has low plasticity as the blocking material and is extruded with difficulty by a mud gun, while the use of more than 40% by weight of the binder will result in the production of a refractory composition which tends evolves a large amount of gases after filled in the pig iron or steel outlets to blow back the refractory composition so filled thereby allowing the molten pig iron or steel to gravity flow through the opening made in the filled composition. In addition to these problems in this case, there are raised problems as to an increase of cavities in the sintered filled composition, a decrease in corrosion resistance thereof, and the like. The refractory composition which is a blocking material, may be easily produced by adding the binder to a refractory material such as alumina, carborandum, coke or clay and then kneading the resulting mixture.

The blocking materials for blocking the pig iron outlet according to this invention have satisfactory kneadability as well as satisfactory wettability with mud material, and they will soon be strengthened with a high initial strength after filled in position. Heretofore used tar mud will evolve black smoke during or after the filling thereof (the black smoke being evolved from the tar mud charged in a mud gun or from the one filled in a furnace). Further, when the conventional tar mud blocking the pig iron outlet is perforated with a perforator, it will be suddenly exposed to a high temperature of the molten pig iron before the binder contained in the mud forms intercarbon bondage thoroughly thereby evolving black smoke and causing unusual dust generation since the initial strength of the binder is low. Thus, the conventional tar mud will remarkably deteriorate the operational environments when used. The late hardening or strengthening of the mud material will result in decreasing the corrosion resistance of the pig iron outlet, enlarging the diameter thereof and shortening the time for discharging the pig iron. This not only decreases the efficiency of pig iron discharging operation, but also endangers the workers.

The blocking materials for the pig iron outlet according to this invention only evolves a small volume of white smoke thereby remarkably improving the operational environments. In addition, they eliminate the drawbacks of the conventional tar mud since they can be hardened or strengthened soon after their use.

The accompanying drawing illustrates a process for the production of binders embodying this invention.

Referring now to the accompanying drawing which shows a diagrammatic view of an exemplary apparatus for carrying out a process for the production of hydrocarbon-derived binders of this invention, a starting oil 1 is passed through a line (a) to a first heater 2 where the oil 1 is heated to a predetermined temperature. The oil 1 so heated is passed to a first-step agitating vessel 3 wherein perfect mixing of the oil 1 is attained by a first agitating vane 11. The first-step agitating vessel 3 is maintained at a fixed pressure by the use of a pressure control valve 5. In addition, a part of the oil treated in the first-step agitating vessel is circulated, by a first circulating pump 4, through a line (h) to the first heater 2 where it is mixed with an incoming starting oil. A first-step treated oil continuously withdrawn from the first-step agitating vessel is passed through a line (c) to a second heater 6 where it is heated to a predetermined temperature. The oil so heated in the second heater 6 is charged into a second-step agitating vessel 7 where perfect mixing of the oil is attained by a second agitating vane 12. The second-step agitating vessel is maintained at a fixed pressure by a pressure control valve 9. In addition, a part of the second-step treated oil is circulated, by a second circulating pump 8, through a line (i) to the second heater where it is mixed with the first-step treated oil.

The second-step treated oil continuously withdrawn from the second-step agitating vessel is passed through a line (e) to a reduced-pressure flush tower 10 from which product pitch is obtained through a line (f).

This invention will be better understood by the following non-limitative Examples.

EXAMPLE 1

There was provided a heavy residual oil produced as a by-product at the time of steam cracking of naphtha. The heavy residual oil so provided had the properties as shown in the following Table 1. The heavy residual oil which was the starting oil, was heated treated by the use of a reforming apparatus as indicated in the accompanying drawing. The starting oil was passed at a flow rate of 100 l/hr through a line (a) to a first heater (having 21.7-mm diameter heating pipes) 2 to heat the oil to 340° C., after which the heated oil was continuously charged into a 300-liter first-step agitating vessel 3 wherein the agitator agitated the oil under conditions that no stagnation of the oil was caused. The oil so charged was heat treated for an average residence time of 3 hours in the first-step agitating vessel 3 maintained at 340° C. and 14 Kg/cm²G (adjusted by a pressure control 5). The flow rate of the oil in the first heating pipes was maintained at 2 m/sec by circulating the oil via a line (h) between the first-step agitating vessel and the first heater by the use of a first circulating pump 4.

The first-step treated oil withdrawn continuously from the first-step agitating vessel was passed through a line (c) to a second heater 6 where it was heated to 400° C. The oil so heated was charged continuously into a 300-liter second-step agitating vessel 7 maintained at 400° C. and 10 Kg/cm²G by a pressure control valve 9. The agitating conditions were the same as in the first-step agitating vessel. The flow rate of the oil in the second heating pipes was maintained at 2 m/sec. by circulating the oil via a line (i) between the second-step agitating vessel and the second heater by the use of a second circulating pump 8. The second-step treated oil withdrawn continuously from the second-step agitating vessel after the end of an average residence time of 3 hours therein, was passed through a line (e) to a reduced-pressure flush tower 10 maintained at a pressure of 350 mmHg, thereby to continuously distil off a light oil fraction boiling at substantially lower than 200° C. and obtain a binder as the product. The results are indicated in Table 2.

Table 1

| Properties of starting oil | | |
|---|---|---|
| Specific gravity (15° C./4° C.) | | 1.047 |
| Fixed carbon (%) | | 4.2 |
| Distillation analysis | Initial b.p. | 156 (°C.) |
| | 5% | 179 |
| | 10% | 195 |
| | 20% | 208 |
| | 30% | 218 |
| | 40% | 235 |
| | 50% | 269 |
| | 60% | 312 |
| | 70% | 346 |

EXAMPLE 2

The procedure of Example 1 was followed except that the first and second treating conditions used were as indicated in Table 2. The results are shown in Table 2.

Comparative examples 1–2

A conventional process comprising a conventional one-step heat treatment was compared with the process of this invention.

The same starting oil as used in Example 1 was charged into the second heater through the line (c) (refer to the accompanying drawing), passed to the second-step agitating vessel where it was heat treated under the conditions as indicated in Table 2, and then treated in the same manner as in Example 1 thereby obtaining a binder. The results are also as shown in Table 2.

COMPARATIVE EXAMPLE 3

The procedure of Example 1 was followed except that the temperature in the first heater and the first-step agitating vessel was raised to 250° C., to obtain a binder. The results are as indicated in Table 2.

Table 2

| | First-step treating conditions | | | Second step treating conditions | | | Binder obtained | | |
|---|---|---|---|---|---|---|---|---|---|
| | Temp. (°C.) | Pressure (Kg/cm²G) | Average residence time (hr) | Temp. (°C.) | Pressure (Kg/cm²G) | Average residence time (hr) | Viscosity at 50° C. (cp) | Fixed carbon (%) | Yield of binder (%) |
| Example 1 | 340 | 15 | 1 | 400 | 10 | 1 | 1,200 | 35 | 70 |
| Example 2 | 315 | 12 | 3 | 390 | 8 | 3 | 1,400 | 34 | 72 |
| Comparative example 1 | — | — | — | 400 | 10 | 1 | 1,500 | 32 | 60 |
| Comparative example 2 | — | — | — | 350 | 10 | 1 | 800 | 21 | 85 |
| Comparative example 3 | 250 | 15 | 1 | 400 | 10 | 1 | 1,800 | 36 | 65 |

EXAMPLES 3-4, COMPARATIVE EXAMPLES 5-8

Twenty-five (25) parts by weight of each of the binders so obtained were incorporated with 100 parts by weight of refractory material for blocking the pig iron outlet of a blast furnace, the refractory material being composed of coarse particles (5 mm–1 mm), medium particles (0.1 mm–less than 1 mm) and fine particles (less than 0.1 mm) in the mixing ratio as shown in Table 3, and the whole was then mixed in an ordinary kneader to obtain a refractory composition.

The refractory compositions so obtained were each tested for their performance as a blocking material for pig iron outlet of a blast furnace. The results are shown in Table 4.

For further comparison, 65 parts by weight of coal tar pitch were mixed with 35 parts by weight of creosote oil to prepare a binder having a viscosity of 1300 cps at 50° C. and a fixed carbon content of 34% (Comparative example 4). The binder so obtained was also tested with the result being also shown in Table 4.

It is confirmed from Table 4 that the refractory compositions of this invention have a greatly improved hot bending strength (measured at 600° C. after held for 20 minutes), improved extrudability and less smoke generation or evolution, and, therefore, they are very excellent in said respects as compared with the conventional or comparative refractory compositions. Further, it is apparent from Table 4 that as compared with the refractory compositions (Comparative examples 1-2) wherein was used the binder obtained by the conventional one-step reaction, those of this invention have improved hot bending strength at 600° C. and 1400° C. and are therefore excellent.

Table 3

| | | | (Parts by weight) |
|---|---|---|---|
| Coarse particle | Coke | 20 | |
| " | Alumina | 20 | " |
| Medium particle | Silicon carbide | 15 | " |
| " | Coke | 15 | " |
| " | Alumina | 10 | " |
| Fine particle | Clay | 10 | " |
| " | Silicon carbide | 10 | " |

Table 4

| Refractory composition obtained | Binder used | Extrudability Extruding pressure (Kg/cm$^2$) | Hot bending strength (Kg/cm$^2$) 600° C., Held for 20 min. | Hot bending strength (Kg/cm$^2$) 1400° C., Held for one hour | Smoke evolution at 600° C. |
|---|---|---|---|---|---|
| Example 3 | Binder of this invention obtained in Example 1 | 21 | 10 | 21 | White smoke evolved |
| Example 4 | Binder of this invention obtained in Example 2 | 20 | 11 | 22 | " |
| Comparative example 5 | Binder obtained in Comparative example 1 | 20 | 7 | 17 | " |
| Comparative example 6 | Binder obtained in Comparative example 2 | 23 | 8 | 15 | " |
| Comparative example 7 | Binder obtained in Comparative example 3 | 30 | 8 | 16 | " |
| Comparative example 8 | Conventional binder of Comparative example 4 | 25 | 5 | 20 | Large volume of black smoke evolved |

What is claimed is:

1. An amorphous refractory composition comprising refractory aggregate and a petroleum-derived binder prepared by:
    providing as the starting oil a fraction boiling at not lower than 150° C., the fraction being obtained by thermal or steam cracking of petroleum-derived hydrocarbons,
    feeding the thus provided fraction continuously into a first-step agitating vessel maintained at a pressure of at least 2 Kg/cm$^2$ and a temperature of from 300° to 360° C., where the fraction is heat treated for an average residence time of at least 15 minutes,
    withdrawing the first-step treated fraction continuously from the first-step agitating vessel,
    feeding the thus-withdrawn first-step treated fraction continuously into a second-step agitating vessel maintained at a temperature of from 370° to 450° C., where the first-step treated fraction is heat treated for an average residence time of from 30 minutes to 10 hours,
    withdrawing the second-step treated fraction continuously from the second-step agitating vessel and
    removing the light fraction from the second-step treated fraction, thereby to obtain the petroleum-derived binder.

2. An amorphous refractory composition according to claim 1, wherein in the preparation of the binder the light fraction removed from the second-step treated fraction is a fraction boiling at lower than 200° C.

3. An amorphous refractory composition according to claim 1, wherein the binder and refractory aggregate are contained in a ratio by weight of 15–40:60–85.

4. An amorphous refractory composition according to claim 1, wherein the refractory aggregate is at least one member selected from the group consisting of coke, alumina, silicon carbide, clay, agalmatolite and Schamotte.

5. An amorphous refractory composition according to claim 1, wherein the refractory aggregate consists of, by weight, 10–40 parts of coke, 20–40 parts of alumina, 10–30 parts of silicon carbide, 5–25 parts of clay, 0–30 parts of agalmatolite and 0–30 parts of Schamotte.

6. An amorphous refractory composition according to any one of the preceding claims, wherein the binder has a viscosity of 100–10000 cps at 50° C.

* * * * *